United States Patent [19]

Pierini

[11] 4,304,645

[45] Dec. 8, 1981

[54] PROCESS FOR REMOVING HELIUM AND OTHER IMPURITIES FROM A MIXTURE CONTAINING DEUTERIUM AND TRITIUM, AND A DEUTERIUM/TRITIUM MIXTURE WHEN PURIFIED IN ACCORDANCE WITH SUCH A PROCESS

[75] Inventor: Giancarlo Pierini, Varese, Italy

[73] Assignee: European Atomic Energy Community (Euratom), Plateau du Kirchberg, Luxembourg

[21] Appl. No.: 111,072

[22] Filed: Jan. 10, 1980

[30] Foreign Application Priority Data

Jan. 22, 1979 [GB] United Kingdom ............... 02259/79

[51] Int. Cl.$^3$ ............................................. C25B 1/02
[52] U.S. Cl. ..................................... 204/129; 204/130
[58] Field of Search ....................... 204/129, 130, 101

[56] References Cited

U.S. PATENT DOCUMENTS

| | | | |
|---|---|---|---|
| 3,306,832 | 2/1967 | Lewis | 204/129 |
| 4,054,496 | 10/1977 | Arrathoon | 204/129 |
| 4,190,507 | 2/1980 | Hesky | 204/129 |
| 4,190,515 | 2/1980 | Butler | 204/129 |
| 4,191,626 | 3/1980 | Hammerli | 204/129 |

*Primary Examiner*—T. M. Tufariello
*Attorney, Agent, or Firm*—Stevens, Davis, Miller & Mosher

[57] ABSTRACT

A process for removing helium and other impurities from a mixture containing deuterium and tritium, which process comprises the steps of: separating from the mixture isotopes of hydrogen in any of their diatomic combined forms; oxidizing the separated isotopes to their corresponding oxides; separating tritium oxide and deuterium-tritium oxide from the oxides thus formed; and electrolyzing the separated oxides to deuterium and tritium.

Preferably the impure mixture of deuterium and tritium is a waste product of a fusion reactor, and the purified deuterium/tritium mixture is recycled to the reactor.

9 Claims, 1 Drawing Figure

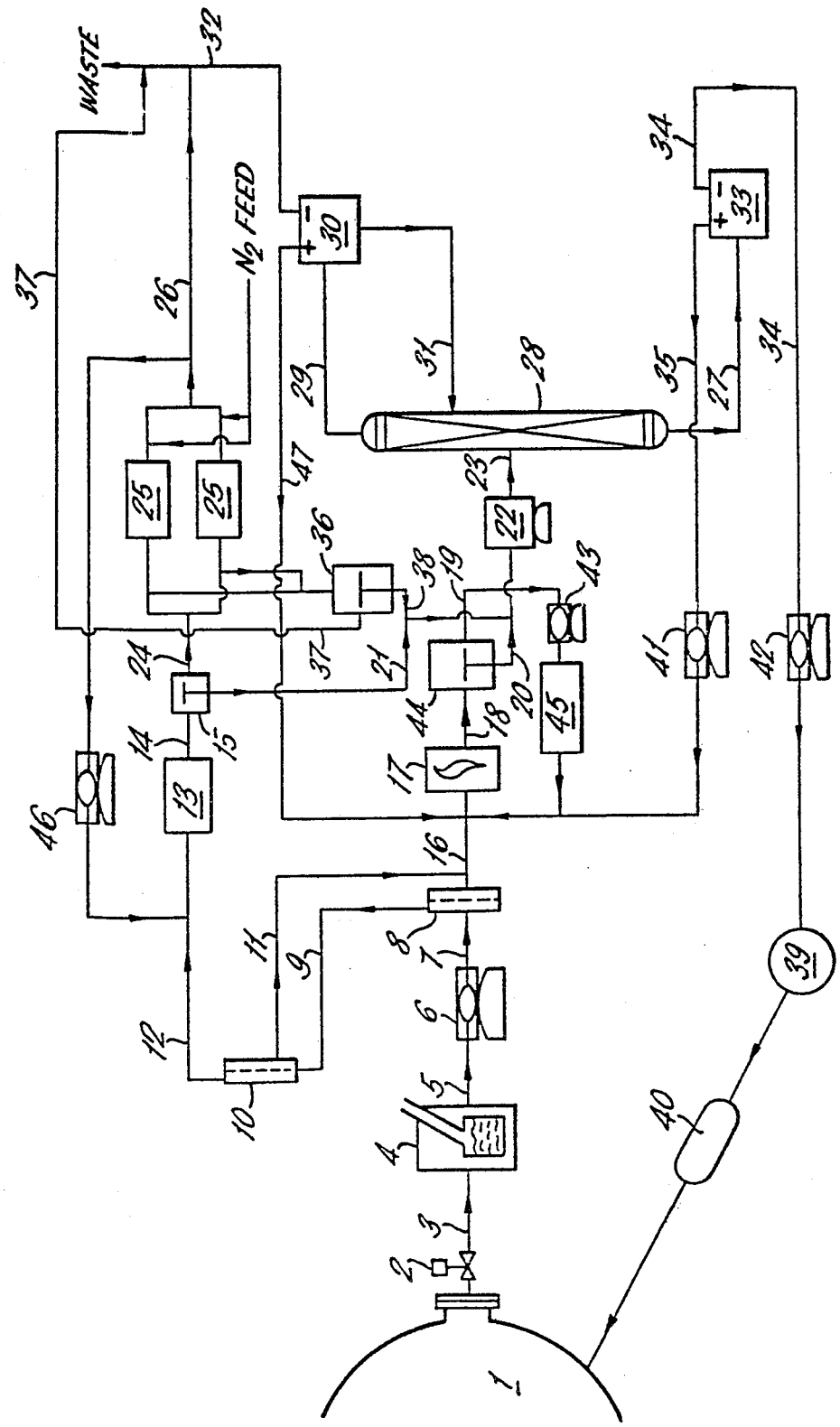

PROCESS FOR REMOVING HELIUM AND OTHER IMPURITIES FROM A MIXTURE CONTAINING DEUTERIUM AND TRITIUM, AND A DEUTERIUM/TRITIUM MIXTURE WHEN PURIFIED IN ACCORDANCE WITH SUCH A PROCESS

BACKGROUND OF THE INVENTION

1. Field of the Invention

This invention relates to a process for removing helium and other impurities from a mixture containing deuterium and tritium, and a deuterium/tritium mixture when purified in accordance with such a process, and, more particularly, to a process for the processing of spent plasma removed from a fusion reactor.

The process of this invention is applicable to a plasma formed by mixtures of deuterium and tritium contaminated by the helium produced by the following fusion reaction:

$$D + T \rightarrow He^4 + neutron$$

Other impurities are probably present in the plasma such as CO, $CO_2$, $N_2$, NO, $NO_2$, $N(D,T)_3$, $C(D,T)_4$, $C_2(D,T)_6$ having a very small concentration of about 2-3%. Even protium is expected to be present at a concentration of less than 1%.

All these impurities originate from many factors, of which the major ones are material degassing phenomena and the air infiltration even if in microquantities.

2. Description of the Prior Art

The prior art is replete with disclosures relating to the treatment of deuterium and tritium containing the above-mentioned impurities which are expected to accumulate in a real fusion burn. In the known processing design for such a fuel cycle, it is assumed to make recourse to extremely costly and very advanced procedures such as selective impurities cryogenic separation and hydrogen isotopes cryogenic distillation.

The overall dimension of these units and the other ones related to the process require a large facility for their containment.

Moreover for safety rules it is a compulsory requirement to have an emergency tritium clean-up system, in case of accident.

For this reaction, large investments and high running costs are demanded in order to maintain tritium release into the atmosphere below the present levels which are becoming more and more strict.

SUMMARY OF THE INVENTION

The present invention deals with the discovery of a process which allows the complete cycle of the fuel from the removal step of exhaust plasma and its impurities from the fusion reactor, the purification of the hydrogen isotopes from Helium and impurities, the oxidation of the hydrogen isotopes to their oxides, their distillation for removing the non-tritium oxide containing water and a mixture of deuterium-tritium oxides, their electrolysis to $D_2$ and $T_2$ and lastly final injection into the toroidal chamber after their molar composition have been correctly adjusted.

In accordance with the present invention, there is provided a process for removing helium and other impurities from a mixture containing deuterium and tritium, which process comprises the steps of: separating from the mixture isotopes of hydrogen in any of their diatomic combined forms; oxidising the separated isotopes to their corresponding oxides; separating tritium oxide and deuterium-tritium oxide from the oxides thus formed; and electrolysing the separated oxides to deuterium and tritium.

Preferably the oxides are separated by distillation under reduced pressure and it is desirable to feed an excess of deuterium oxide to the distillation step.

A palladium membrane is preferably used to effect the isotope-separation step.

Waste products from the isotope-separation step may be oxidised and the oxidised products adsorbed by a molecular sieve drier, before the unoxidised products are vented.

Preferably, waste products from the oxide-separating step are subjected to complementary purification by selective electrolysis in order to remove tritium in any of its diatomic combined forms; which removed tritium is then recycled to the isotope-oxidising step.

In a preferred embodiment of the present invention the impure mixture of deuterium and tritium is a waste product of a fusion reactor, and the purified deuterium/tritium mixture is recycled to the reactor.

The invention also provides a deuterium/tritium mixture when purified in accordance with the process of the invention.

The process is applicable to all Tritium-Deuterium fusion reactors and for any choice that could be made about the operational procedure of the reactor, in other words if continuous or pulsed reactors are concerned. In the first case it is quite difficult to calculate the amount of tritium and deuterium to be processed per day, because it depends on different technological procedures (use of divertor or cold gas blanket), while for the second case the fuel will be about 2700 g/day of an equip-molecular quantity of $D_2$ and $T_2$ referring to a 2000 MW thermal power reactor to a burn/down ratio of 0.78 and a burn up of 10% that corresponds to a rate of 1.736 g of fuel to be processed per minute.

BRIEF DESCRIPTION OF THE DRAWINGS

The single FIGURE in the accompanying drawing shows in a schematic flow diagram a process for treating the waste product of a Tritium-Deuterium fusion reactor.

DESCRIPTION OF THE PREFERRED EMBODIMENT

From the toroidal chamber 1 of the fusion reactor, the exhaust plasma containing the impurities and $He^4$ in a concentration between 0.1 to 30%, according to the burn up, is pumped out via flutter valve 2 and line 3 to cryosorption pump 4.

Since the cryosorption pump is saturated, the gas condensed and absorbed is released by heating and transferred by a diaphragm or double bellows pump 6 by means of lines 5 and 7 to a separator unit 8.

This unit allows the separation of the hydrogen isotopes from the impurities passing through a palladium membrane unit 8 almost completely. A second palladium membrane unit 10 is linked by a line 9 to unit 8 for the purpose of improving the separation procedure.

The hydrogen isotopes are cycled by means of line 11 to line 16 and then to burner 17 where the gas is presence of an excess of oxygen is transformed almost completely to the oxide form 18. What is not burnt up will be recycled by means of diaphragm pump 43 through line 19. A very effective oxidising catalytic reactor 45 is placed on the line 19, in order to transform quantitatively any residual hydrogen isotopes to their oxidised form. Different types of catalyst are used. Usually they are small pellets on which surface platinum, palladium or CuO have been deposited. Another candidate can be Hopcalite. The temperature can be maintained as low as 200° C., but in some cases, when traces of impurities as $N(D,T)_3$ or $C(D,T)_4$ are eventually present, it must be brought to 400°-500° C. for their transformation to $N_2$, $CO_2$, $D_2O$ and $T_2O$. In addition, a condenser 44 is placed on the loop as to condense all $D_2O$, $T_2O$, and $H_2O$ ($\leq 1\%$) formed in the burner and in the catalytic reactor 20.

The helium and the impurities that contain tritium and deuterium even in the chemical form mentioned above, cannot be released to the atmosphere but must be treated in order to recover all of the tritium. In this process, the gas is fed via line 12 to another oxidising catalytic reactor 13 at 500° C. and is transferred via lines 14 and 24 to the molecular sieve drier system 25 for the absorption of $D_2O$, $T_2O$, ($H_2O \leq 1\%$). The gas is then continuously recycled by transfer pump 46 until complete reaction is achieved. The residual gas 26 is then fed to a stack or to a waste disposal system.

In order to minimize the water loading of these units, a condenser 15 is placed down-stream of the catalytic reactor 13 for removing as much water as possible.

The system 25 is made up of two molecular sieve driers in parallel. One of these is a stand-by and will be in operation while the other one (before reaching the breakthrough point) is being heated for desorbing the water with the aid of a stream of dry nitrogen. The water 38 is collected by a condenser 36 and, together with the water 20, 21 from condensers 15 and 44, is fed continuously by transfer pump 22 to distillation column 28 by means of line 23. The small input of water requires only a very small distillation column and consequently this allows a low inventory of tritium for the low hold-up of the column. The residual gases 37 from condenser 36 are vented.

In order to reduce the tritium inventory further, one can make recourse to the method of adding an excess of liquid $D_2O$ to the column at reduced pressure, e.g. from 10 to 50 mm Hg pressure.

The principal aim of the distillation column is to separate the major amount of the protium forms of water, $H_2O$, HDO from the other ones such as HTO, $D_2O$, DTO, $T_2O$. The small amount e.g. 1% of protium derivates, practically permits operation at total reflux for a long time and allows the occasional withdrawal of the protium-rich minor portion of distillate. Another aim is to withdraw from the bottom mixtures of $D_2O$, $T_2O$, DTO. Experimental and complementary theoretical results suggest that the required separation can be achieved by using a column of about 200 theoretical plates, 1.5 cm. diameter and 2 meter high, filled up with compressed wires.

The column works under vacuum in order to increase the value of the separation coefficient. In fact it can vary from 1.0543 at 100° C. to 1.19949 at 25° C. as far as the mixture of $H_2O$ and $T_2O$ are concerned.

The (D,T)O 27 is transferred to electrolytic cell 33 where it is decomposed to $T_2$, $D_2$ and $O_2$. The first two 34 are pumped by a diaphragm pump 42 to gas storage unit 39 and then to fuel injection device 40 in order to be fed to the toroidal chamber 1. The $O_2$ 35 which is used for the catalytic reactions, is recycled by diaphragm pump 41. The distillate, which is made up of $H_2O$, HDO and $D_2O$ together with small amounts of DTO of the order of 10–4% with respect to the total molar stream, is transferred by means of line 29 to electrolytic cell 30 for complementary purification by the selective electrolysis of $H_2$ and $D_2$ from $T_2$. This separation is feasible since the amount of tritium oxide in the cell is very small. This electrolysis is carried out by means of small cells using NaOH, $H_2SO_4$ or another salt or ion exchange membrane as the electrolyte, and with anode electrodes made of nickel or iron/nickel. Such salts, in which the hydrogen is replaced by deuterium, are used for wetting membranes of, say, asbestos or similar porous materials which allow the separation of hydrogen from oxygen during electrolysis.

Other materials and new sophisticated cells could also be used. For instance, the electrolytic cell 33 could operate in the vapour phase in order to reduce the tritium inventory due to the hold-up of the same. In this case, it is necessary to vaporize the feeding mixtures of $D_2O$-$T_2O$ downstream of the distillation column. An ion exchange membrane may be used in this method, a commercial version of which is called NAFION by Dupont. The residual liquid from the cell 30 is returned to the column 28 by line 31.

$H_2$, $D_2$ with a trace of $T_2$ are given off at the cathode of the cell 30 and are vented 32, while the $O_2$ 47 generated at the anode of the cell is recycled to the burner 17.

The equation governing the electrolytic separation of the hydrogen isotopes is easily derived. The heavy isotopes are discharged at the cathode more slowly than protium.

The effective separation depends on the values of $\alpha$ and $\beta$ which are the separation factors for deuterium and tritium with respect to protium, and vary sensibly according to the choice of electrolytes and electrodes. The known data are already high enough to attain a good separation especially in those cases when the tritium concentration is low. In the FIGURE only one cell is shown. A multistage operating cell could, however, be used in order to meet the safety requirements for tritium release in the atmosphere or for its disposal.

In an alternative embodiment (not shown), a second distillation column can be used to assist the separation of the protium forms of water. In this case, the first column 28 separates a major proportion of the DTO and $T_2O$ from its distillate and, since the column need only have a comparatively small diameter for this separation duty, it requires a smaller tritium inventory than for a single column. The final separation of $H_2O$ and HDO from the tritium forms of water is effected by feeding the distillate of the first column 28 into the middle of the second column, which, because of the reduced quantity of tritium-containing forms of water being handled therein, can be larger than the first column 28. The distillate from the second column is fed to the electrolytic cell 30, while the bottoms residue is either returned to the middle column 28 or is sent direct to electrolytic cell 33 in accordance with the requirements of the process.

I claim:

1. A process for removing helium and other impurities from a mixture containing deuterium and tritium, which process comprises the steps of:
    separating from the mixture isotopes of hydrogen in any of their diatomic combined forms;
    oxidising the isotopes thus separated to their corresponding oxides; separating tritium oxide and deuterium-tritium oxide from the oxides thus formed;

and electrolysing the oxides thus separated to deuterium and tritium.

2. A process as claimed in claim 1 wherein the oxides are separated by distillation under reduced pressure and an excess of deuterium oxide is fed to the distillation step.

3. A process as claimed in claim 2 wherein a stream of liquid $D_2O$ is introduced to the distillation step at from 10 to 50 mm Hg pressure so as favourably to affect the separation of protium from tritium and sensibly to reduce the tritium inventory.

4. A process as claimed in claim 1 wherein a palladium membrane is used to effect the isotope-separation step.

5. A process as claimed in claim 1 wherein waste products from the isotope-separation step are oxidised, and the oxidised products are adsorbed by a molecular sieve drier before any unoxidised products are vented.

6. A process as claimed in claim 1 wherein waste products from the oxide-separating step are subjected to complementary purification by selective electrolysis in order to recover tritium in any of its diatomic combined forms, which recovered tritium is then recycled to the isotope-oxidising step.

7. A process as claimed in claim 1 wherein most of the processing steps handle the tritium in the form of its liquid oxides.

8. A process as claimed in claim 1 wherein the mixture of deuterium and tritium is a waste product of a fusion reactor, and wherein purified deuterium and tritium formed by the process is recycled to the reactor.

9. A deuterium/tritium mixture when purified in accordance with a process as claimed in claim 1.

* * * * *